Oct. 15, 1946.    A. F. MESTON    2,409,579
COMPOSITE ELECTRODE
Filed June 16, 1944    4 Sheets-Sheet 1
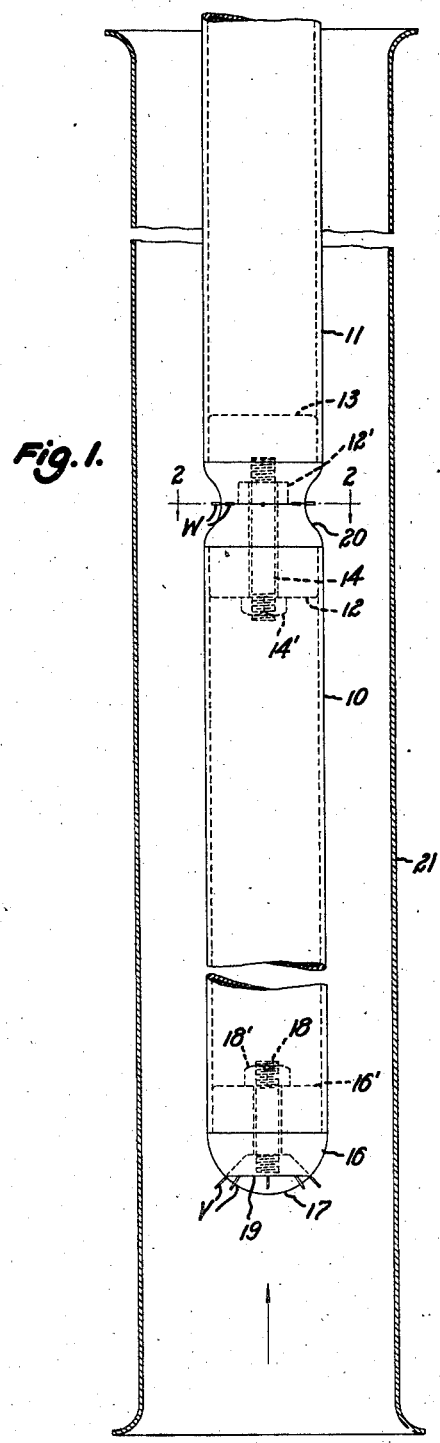
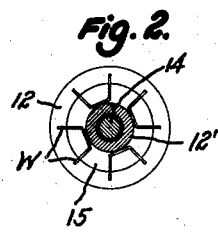
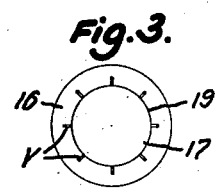
Inventor:
Archibald F. Meston
Pierce & Scheffler
Attorneys

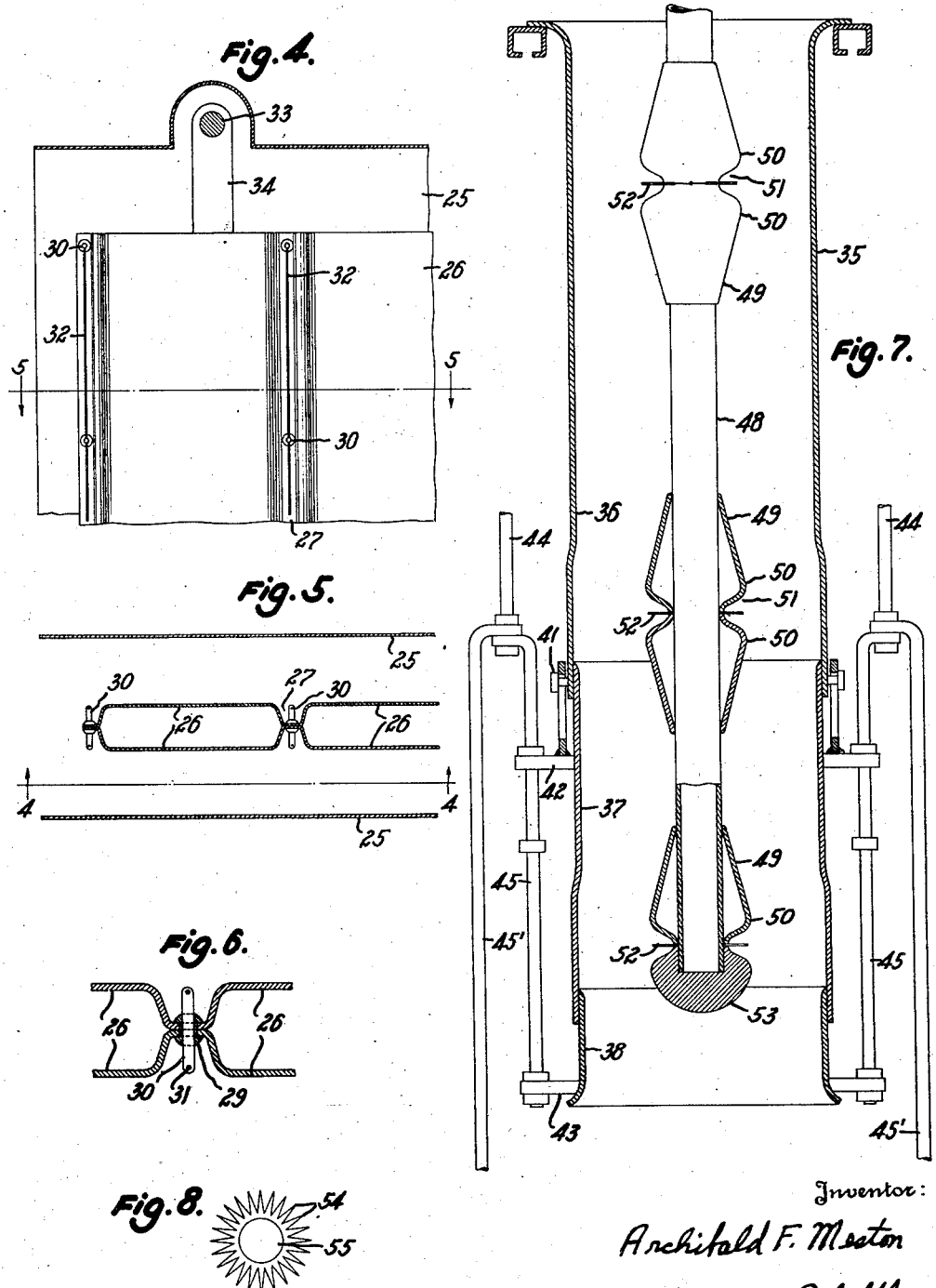

Oct. 15, 1946.　　　A. F. MESTON　　　2,409,579
COMPOSITE ELECTRODE
Filed June 16, 1944　　　4 Sheets-Sheet 3

Inventor:
Archibald F. Meston
By Pierce & Scheffler
Attorneys.

Oct. 15, 1946.  A. F. MESTON  2,409,579
COMPOSITE ELECTRODE
Filed June 16, 1944   4 Sheets-Sheet 4
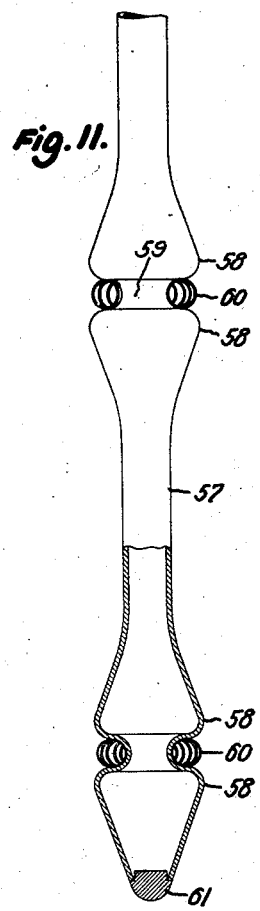
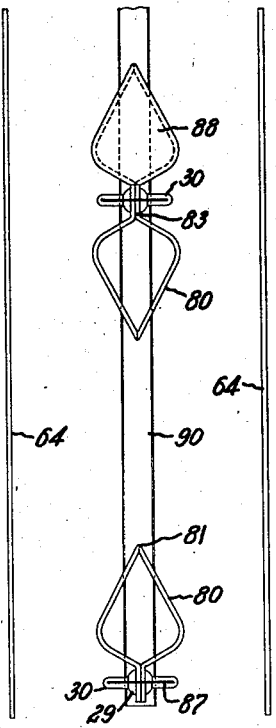
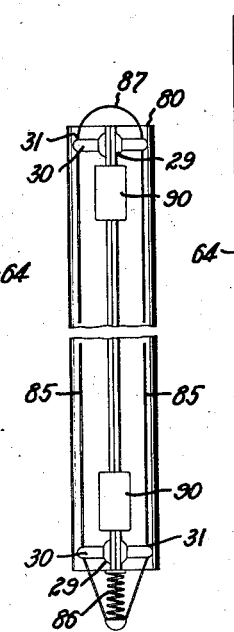
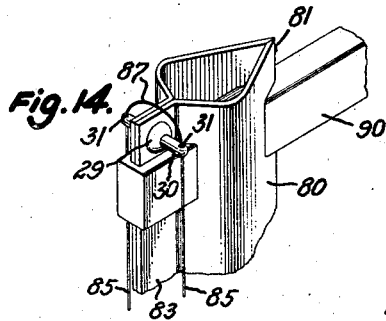

Patented Oct. 15, 1946

2,409,579

UNITED STATES PATENT OFFICE 2,409,579

COMPOSITE ELECTRODE

Archibald F. Meston, Bound Brook, N. J., assignor to Research Corporation, New York, N. Y., a corporation of New York Application June 16, 1944, Serial No. 540,609

11 Claims. (Cl. 183—7)

This invention relates to a system of electrodes useful in establishing an electric field or electric fields across a gas-filled space for the purpose of ionizing the gas and electrically transporting particles suspended in the gas. It relates in particular to a composite electrode comprising one or more attenuated elements from which corona discharge can be caused to emanate and an adjacent element of extended surface upon which a strong non-discharging electric field can be caused to terminate.

In the following description and exposition, the term "composite electrode" refers to an electrode which functions as a discharge electrode, but differs from the more usual types of discharge electrodes in construction and in the electrical conditions it provides, as will be pointed out hereinafter. More descriptively, it is sometimes referred to as a "discharge electrode" or "precipitating electrode." The term "collecting electrode" will be used to designate those electrodes which in common electrical precipitation practice provide surfaces for the reception or collection of particles which have been driven from a gas stream by an electric field, and upon which a portion, at least, of the electric field terminates. The gas treating apparatus described in illustrating the present invention comprises one or more composite electrodes and one or more complementary collecting electrodes. Electrodes are complementary to each other when they are maintained, respectively, at different electrical potentials and serve as the opposite terminals of the electric fields which exist in the medium or space between them.

A principal object of the invention is to provide electric treating means including a composite discharge electrode which, when energized at a suitable potential difference with respect to a complementary electrode of the so-called "collecting" type, effects the formation of a charging field, comprising an ionizing discharge, and a transporting or precipitation field, without discharge, in closely adjacent zones.

A particular object of the present invention is to provide for gas treaters comprising complementary electrodes, a discharge electrode of the composite type having extended non-discharge surfaces including depressed portions, and attenuated discharge elements positioned in said depressions, no discharge portion of said elements extending outwardly toward a complementary electrode beyond the adjacent extended surfaces.

Another object of the invention is the provision of an electrical precipitator having complementary electrodes arranged to provide discharge zones alternately with non-discharge precipitating zones; one of the electrodes being a composite discharge electrode having extended non-discharge surfaces with longitudinally spaced depressions therein and a plurality of attenuated members in the depressions for initiating discharges which will have low energy output due to electric shading by the adjacent extended surfaces.

These and other objects and advantages are obtained by the provision in an electrical procipitator of complementary electrodes including a composite electrode comprising an extended surface portion free from surface elements of radius of curvature small enough to produce corona discharge under operating conditions and having grooves or depressed regions spaced longitudinally therealong, and a plurality of attenuated members of very small radius of curvature supported in the depressed regions for producing corona discharge when the apparatus is energized, no discharge producing portion of said attenuated members extending outwardly toward a complementary electrode beyond the extended surface portion adjacent said discharge portion.

While the character of surface which will produce corona discharge will vary with such conditions as potential difference, electrode space and character of the gas, the extended surface member of the composite discharge electrode should not, in general, include surface portions having a radius of curvature substantially less than one-tenth inch while the attenuated discharge members will include surface portions having very small radii of curvature. For example, in the preferred embodiment of the invention directed at applications where the production of ozone is to be held to low values, the radii of curvature of the discharge members are of the order of five-thousandths of an inch or less.

The invention will be more particularly described with reference to the accompanying drawings in which:

Fig. 1 is a fragmentary elevation in partial section of an electrical treater embodying the principles of the invention;

Fig. 2 is a section on line 2—2 of Fig. 1;

Fig. 3 is an end view of the composite electrode of Fig. 1;

Fig. 4 is a fragmentary elevation of an embodiment of the invention comprising electrodes in the form of flat plates;

Fig. 5 is a fragmentary longitudinal section through the precipitator illustrated in Fig. 4 on line 5—5 of Fig. 4;

Fig. 6 is an enlarged sectional view of a detail of the composite electrodes illustrated in Figs. 4 and 9;

Fig. 7 is a sectional elevation of a treater constructed in accordance with the present invention, and including a composite electrode with bulging portions and discharge elements supported in grooves in the bulging portions;

Fig. 8 is a plan view of a discharge element useful in the composite electrode shown in Fig. 7;

Fig. 11 is a fragmentary view, partially in section, of an alternate composite electrode which can be used in the treater illustrated in Fig. 7;

Fig. 12 is a fragmentary plan view and Fig. 13 is a fragmentary end view of a treater with extended plate collecting electrodes and comprising another embodiment of a composite electrode with bulging portions constructed in accordance with the present invention; and Fig. 14 is an enlarged perspective view of a constructional detail of the composite electrode of Figs. 12 and 13.

Figs. 1, 2 and 3 illustrate the application of the principles of the invention to electrical treaters having a cylindrical or "pipe" collecting electrode.

Figure 9:
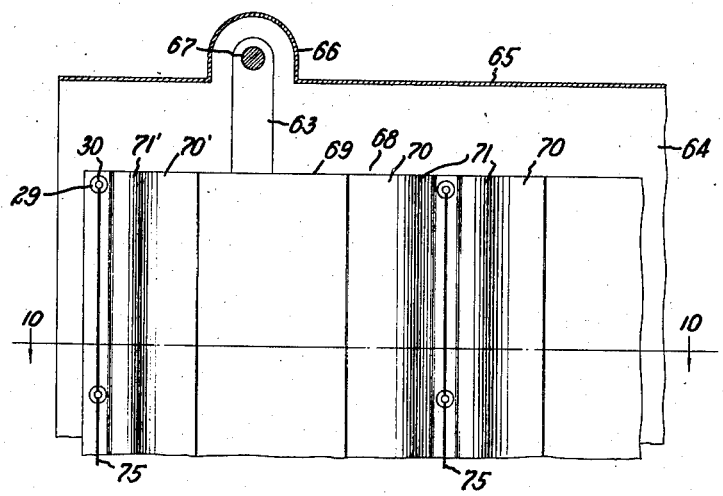
Fig. 9 is a fragmentary sectional elevation taken on line 9—9 in Fig. 10 of a treater with electrodes comprising extended flat plates and embodying bulging portions about the discharge elements.

In this embodiment of the invention the composite precipitating electrode consists of a piece of smooth straight tubing 10 joined to a similar piece of tubing 11 by two intermediate parts 12 and 13 and a rounded structure on the other end of tube member 10 made up of members 16 and 17; also, attenuated prong members W clamped in joint 15 between members 12 and 13 and similar prong members V clamped in joint 19 between members 16 and 17. Portions of the exterior surface of members 12 and 13 are cut down to form, when joined together, a broad groove 20 with rounded shoulders and it is at the bottom of this groove that prongs W are attached. Member 12 has a boss 12' which fits into a complementary recess in member 13 for purposes of alignment. A stud 14 screwed into member 13 extends through a hole in member 12 and the two members are pulled tightly together clamping prongs W between them by screwing up nut 14'. The free ends of members 12 and 13 are pressed into the interior of tube members 10 and 11, respectively, making a carefully aligned continuous structure of the electrode at this point.

Tip member 17, like intermediate member 16, has an arcuate outer surface. The inner surface where it joins member 16 is formed as the frustum of a cone with apex at the point of generation of the arcuate surface. The conical surface is normal to the arcuate surface where it joins the latter. In this example the apex angle is 84°. A stud 18 projects out of the back of member 17, extends through a hole in member 16 and, with nut 18', fastens the two members together, clamping prongs V in joint 19 and causing the prongs to project normally from the surface. The boss 16' on member 16 projects into member 10 and makes a friction fit therewith.

A cylindrical collecting electrode concentric with the precipitating electrode is indicated at 21.

The position of prongs V differs from the position of prongs W in that the former are electrically shaded or masked by extended surface on one side only. With equal lengths of prong, ending an equal distance from the surface of tubular electrode 21, greater discharge can be expected from prongs V than from prongs W, which is often desirable because the gas passing prongs V has not been subjected to prior ionizing discharges. But the discharge from the V prongs can be diminished if desired by shortening them or otherwise varying the discharge distance to complementary electrode 21 or, by adjusting their position so as to vary the shading provided by surface 16.

An effective treating apparatus of the form illustrated in Figs. 1, 2 and 3 may comprise extended surface portions 10, 11 approximately two inches in diameter, with a groove 20 one-quarter inch deep and two-inch overall in width, the minimum radius of the surface of the groove being one-half inch. The collecting electrode tube 21 may, in such case, advantageously be about four inches inside diameter.

Eight prongs W having a length of one-eighth inch and eight prongs V having a length of $\frac{3}{16}$ inch made of .005 inch diameter tungsten wire may be used, spaced about 9½ inches apart along member 10.

With an apparatus of the form and dimensions described, effective precipitation of suspended particles from air, with no spark-over and little or no production of ozone, can be obtained with a voltage of 30 to 35 kv. (root mean square) maintained across the electrodes by connecting the precipitating electrode to a source of rectified high potential alternating current, such as the transformer and rotary mechanical switch arrangement, commonly used in electrical precipitation circuits and grounding the collecting electrode.

The conditions realized by energization of the arrangement just described can be summarized as follows:

An electric field is established which is most intense, on the average over its entire length, between electrode surfaces from which no corona discharge emanates. This portion of the electric field is designated as a precipitating field. Portions of the electrical fields of appreciably less average intensity terminate on attenuated portions of that electrode known as the discharge electrode and cause local corona discharges therefrom. This portion or portions of the field is designated as the ionizing field though it may function to some extent as a precipitating field.

The average strengths of the precipitating and ionizing fields will vary with the distance of the non-ionizing and ionizing portions, respectively, of the discharge electrode from the collecting electrodes. The relative values of precipitating and ionizing fields can thus be made to vary by changing the shape and dimensions of the electrodes, particularly of the discharge electrode.

The flatter and smoother the non-ionizing surfaces of the complementary electrodes, the closer they can be positioned at a given voltage difference without disruptive discharge and the stronger the resulting electric field.

The more attenuated and isolated the discharge elements, the more intense will be the discharge from them, conditions of voltage and electrode spacing remaining constant.

When the discharge elements are positioned in close proximity to a portion of the non-discharging surface, but no closer to the collecting electrode than adjacent portions of the non-discharging surface, the discharge elements will be masked or shadowed by the close-by non-discharging surface and a very high voltage drop across the electrodes will be required if the electric field at the discharge elements is to become intense enough to cause corona discharge. Under these conditions, the precipitating field will have become very strong and effective for migrating charged particles when the ionizing field is still relatively weak and comprises low energy discharges only. Such conditions are especially desirable when air is to be cleaned for human consumption. The intensity of the discharges and the resulting yield of ozone can be controlled while the precipitating field is maintained at as near maximum strength as is practical.

As indicated above, the preferred embodiment of the invention includes prongs or just points, rather than edges or wires, as discharging elements. A prong projecting out from a surface can be the terminal of lines of force extending in every direction except back along the prong. This means that an electric field which is relatively weak a short distance from the prong will be strong enough at the prong itself to cause an ionizing discharge. The closer together the prongs are placed, the weaker will the field at each prong become, or, putting it another way, the more intense the adjacent field must be to cause corona to emanate from the points. When the prongs touch one another the condition presented by an edge is obtained. A wire, positioned adjacent and parallel to an extended surface, for instance, can be used as a discharge element in the present invention as will be pointed out below.

Figs. 4 and 5 illustrate how the invention can be applied advantageously to treaters with vertical plates that divide the gas to be treated into horizontally extending streams and serve as electrodes for the collection of material electrically removed from the gas. Such collecting electrode plates are designated by numeral 25. The composite electrode is made up of two plates 26, preferably of metal, which have trough-like deformations 27 therein, the troughs extending vertically in the sheets. The plates are fastened together with, for example, hollow rivets, such as rivet 29 shown in Fig. 6, with the under sides of the troughs touching back to back and in longitudinal alignment. Pins 30 are inserted in the holes in at least some of the rivets and, in holes or slots 31 near the ends of pins 30, discharge wires 32, which may be of tungsten or nichrome and of the order of .005 inch diameter, are supported longitudinally in, but spacially removed from the walls of, the troughs. The electrode may be supported from high tension bus bars 33 by means of straps 34. The embodiment of the invention shown in Figs. 4 and 5 provides zones of suppressed corona discharge—at the wires extending in troughs 27, alternating with extended regions of strong uniform electric fields free from discharge—which exits between the flat portions of plates 26 and plates 25.

Fig. 7 illustrates a unit of a pipe type precipitator with collecting electrode 35 made up of pipe portions 36, 37 and 38 which partially telescope one within the other in the order mentioned. The telescoping is accomplished by means of operating mechanism which is attached to portions 36, 37 and 38 at fastenings 41, 42 and 43, respectively, and which is connected to any suitable reciprocating source of power by means of rod 44. Rod 44 is, for practical purposes, an extension of rod 45; also, of rod 45' which may be attached to the operating mechanism of an electrode (not shown) similar to electrode 35. The partial telescoping of the several pipe portions provides for cleaning selected areas on the inner surface of electrode 35 where the electric fields are the most intense and most apt to create back discharges from that electrode.

The composite type discharge electrode in Fig. 7 is made up of a tube 48 on which are mounted tapered ferrule-like members 49 with bulging portions 50. They are preferably placed on tube 48 in pairs with the bulging portion of one adjacent the bulging portion of the other. Members 49 are so shaped that when a pair of them is positioned on tube 48, as shown, a trough or depression 51 exists between the members, and, in this depression, appropriate discharge elements 52 are positioned. These elements can be similar to those disclosed in Figs. 1, 2 and 3, and a method of preparing a grid structure with such elements is described in applicant's copending application Serial No. 391,791, filed May 3, 1941 (now U. S Patent No 2,352,651, dated July 4, 1944). A member 53, preferably with rounded closed end as shown, is mounted on the end of tube 48. In this embodiment of the invention the discharge points are positioned more closely to collecting electrode 35 than is the surface of member 48, but the bulging portions 50 project as far, or farther, toward complementary electrode 35 than do elements 52, receive much of the electric field which terminates on the composite electrode, and thus electrically shade the discharge elements and depress the discharges that form upon or immediately adjacent them.

The voltage between the complementary electrodes just described is usually held at values which causes the portions of the electric field adjacent the bulging portions to be very intense. Under such conditions, while collecting certain sorts of particulate matter, at least, trouble from back corona may be realized unless the collected material is removed almost as soon as it is deposited. The cleaning mechanism attached to electrode 35 is arranged to remove the material by scraping the collecting surfaces opposite the bulging portions and the discharge elements between the bulging portions.

Fig. 8 shows a discharge member made from a thin metal sheet and comprising a plurality of sharp prongs 54. Hole 55 is for the insertion of a supporting rod. This member can be used in making up a composite electrode such as the one illustrated in Fig. 7 in which case it takes the place of the wire grid with prongs 52 indicated in Fig. 7.

In Fig. 11 a composite electrode is illustrated in which the supporting member 57 has been expanded by hydraulic pressure, for instance, while being held in a demountable forming die, to form bulging portions 58. Between each pair of bulging portions 58, a groove or depression 59 is left for the reception of a discharge member 60. Member 60 is made, preferably from a coil spring, of very fine wire, and has the advantages of simplicity in shape, ease in manufacture, and efficiency in discharge performance which have been disclosed in U. S. Patent No. 2,231,330, issued to C. M. Gove, February 11, 1941. The discharges emanate from the outer portions of the several helices of the coil spring and the intensity of the discharges—for a given voltage difference between the complementary electrodes, can be decreased by decreasing the pitch of the spring—which spaces the turns of wire more closely, and by decreasing the diameter of the coil—which positions the discharge portions more closely within the electric shading of the bulging surface portions. The end of the composite electrode may be closed with a plug 61.

Figure 10:
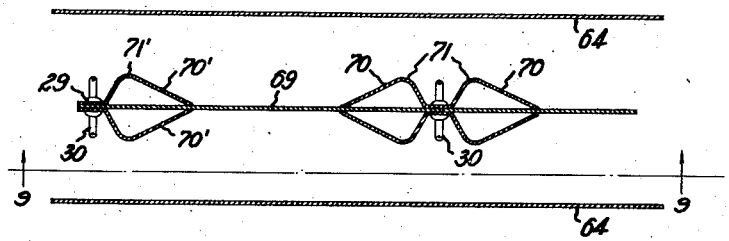
Fig. 10 is a fragmentary longitudinal section on line 10—10 in Fig. 9.

Figs. 9 and 10 illustrate a construction which permits the use of bulging portions with a discharge element positioned in a depression therein, in accordance with the teachings of the present invention, in electric-treaters comprising parallel plate electrodes. The collecting electrodes are represented by plates 64 (to which baffles, scrapers and the like may be attached in accordance with the knowledge of the gas treating art), and a cover plate for the treater is designated by numeral 65, the cover including, in this example, a housing 66 for a bus bar 67 from which depends strap 63 for the support of composite discharge electrode 68, and similar straps, not shown, for supporting other composite electrodes. Composite electrode 68 is built about a flat plate 69. Spaced longitudinally along both sides of plate 69 and attached thereto are a plurality of members 70. These members 70 are shaped with a pair of bulging portions 71, with a depression 72 between, which extend transversely of plate 69. A discharge member 75, which is here indicated as a very fine wire, is supported in each depression, but spaced from adjacent surfaces, by pins 30. Members 70 are preferably spaced along plate 69 so that a member on one side of the plate is immediately opposite a similar member on the opposite side and a single row of rivets 29, shown in more detail in Fig. 6, can be used to attach both members. Members 70 are preferably shaped to slope gradually from the bulging portions 71 to the supporting plate 69 to present non-turbulent flow conditions to the gas passing through the treater. At the entrance end of the treating passages, members 70', with a single bulge, can be used to advantage. In this arrangement, only one nearby extended surface 71' attracts portions of the electric field, which would otherwise terminate on a wire 75, but if it is advisable to offset this condition, pins 30 can be shortened or bent with the result that wires 75 will be farther from plates 64, respectively, and closer to portions 71' and less corona discharge will emanate from them.

The construction shown in Figs. 12 to 14 contemplates limiting the charging and precipitating functions to spaced apart composite members 80 which are supported on horizontally extending bars 90. The extended surface portions of members 80 are shaped similar to members 70 in Fig. 8 except that where the edges 81 of the opposing members are brought together cut-outs are made to provide for bars 90. Rivets 29 project through the bottom of the depressed portions 82 of members 80 preferably just above or just below bars 90. Discharge wires 85 are secured in the holes or slots 31 in top pins 30, pass easily through openings 31 in the pins 30 below and are held under tension by means of a spring 86 under or adjacent the bottom of the electrode. Discharge can be directed toward the roof of the treater by having a discharge wire 87, supported by topmost pins 30, pass over the top of the composite electrode as shown. Cover plates 88 can be fastened over the openings of members 80 to prevent ingress of material and prevent discharge from the top edges of the members.

It will be seen that the composite electrode of the invention may be varied in form and construction over a wide range without departing from the principles of the invention as defined in the claims.

This application is a continuation-in-part of my application Serial No. 391,789, filed May 3, 1941, now U. S. Patent #2,364,641, dated December 12, 1944.

I claim:

1. In an electrical treater including complementary discharge and collecting electrodes, a discharge electrode comprising an extended surface member including a surface portion depressed below the level of adjacent surface portions to provide a concavity in said extended surface member, and attenuated discharge elements positioned in said concavity wholly below the level of said adjacent surface portions.

2. In an electrical treater with complementary discharge and collecting electrodes, a discharge electrode comprising an extended surface member, said extended surface member including non-discharging surface portions convex toward the complementary surfaces of the collecting electrodes and concavities adjacent said convex surface portions, and discharge elements supported wholly in said concavities.

3. In an electrical treater with complementary discharge and collecting electrodes, a discharge electrode comprising an extended surface member substantially parallel to the complementary surface of a collecting electrode, said extended surface member including concavities therein which open only toward the complementary surface of one collecting electrode, and discharge producing elements supported wholly within said concavities.

4. In an electrical treater with complementary discharge and collecting electrodes, a discharge electrode comprising an extended surface member including surface portions substantially parallel to the complementary surface of a collecting electrode alternating with bulging portions presenting non-discharging convex surfaces toward the complementary electrode and defining concavities in said member, and discharge producing elements supported wholly within said concavities.

5. In an electrical treater including complementary discharge and collecting electrodes, a discharge electrode comprising a member having extended non-discharge surfaces including surface portions depressed below the level of adjacent surface portions to provide concavities in said extended surface member and attenuated discharge elements positioned in said concavities, no discharge portion of said elements extending toward a complementary collecting electrode beyond the extended surfaces adjacent said concavities.

6. In an electrical precipitator including collecting electrodes defining a gas passage therebetween, a discharge electrode in said gas passage comprising an extended surface member including a surface portion depressed below the level of adjacent surface portions to provide a concavity in the surface thereof extending transversely of said gas passage, and attenuated discharge elements in said concavity wholly below the level of the extended surface portions adjacent said concavity.

7. In an electrical precipitator including collecting electrodes defining a gas passage therebetween, a discharge electrode in said gas passage comprising an extended surface member including spaced convex bulges extending transversely of said gas passage and defining a concave transverse furrow therebetween, and attenuated discharge elements positioned wholly within said furrow.

8. In an electrical precipitator including a cylindrical collecting electrode, a discharge electrode positioned within said collecting electrode comprising a cylindrical member extending substantially concentrically of said collecting electrode and including a circumferential concavity, and attenuated discharge elements positioned wholly within said concavity.

9. In an electrical precipitator including a cylindrical collecting electrode, a discharge electrode positioned within said collecting electrode comprising a cylindrical member extending substantially concentrically of said collecting electrode and including spaced circumferential convex bulges defining a circumferential concavity therebetween, and attenuating discharge elements positioned wholly within said concavity.

10. A composite discharge electrode comprising an extended surface member including a surface portion depressed below the level of adjacent surface portions to provide a concavity in the surface thereof, and attenuated discharge elements in said concavity wholly below the level of the extended surface portions adjacent said concavity.

11. A composite discharge electrode comprising an extended surface member including spaced convex bulges defining a concave furrow therebetween, and attenuated discharge elements positioned wholly within said furrow.

ARCHIBALD F. MESTON.